US012789852B2

(12) United States Patent
Jang et al.

(10) Patent No.: US 12,789,852 B2
(45) Date of Patent: Nov. 10, 2026

(54) APPARATUS AND METHOD FOR AUTONOMOUS VEHICLE PERFORMING MINIMAL RISK MANEUVER PROXIMATE TO UNSAFE AREAS

(71) Applicants: Hyundai Motor Company, Seoul (KR); Kia Corporation, Seoul (KR)

(72) Inventors: Chan Jong Jang, Hwaseong-Si (KR); Seung Hwan Kim, Siheung-Si (KR); Young Bin Min, Busan (KR); Jong Sung Park, Hwaseong-si (KR); Jong Won Kim, Gwangmyeong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 71 days.

(21) Appl. No.: 18/659,065

(22) Filed: May 9, 2024

(65) Prior Publication Data

US 2024/0375683 A1 Nov. 14, 2024

(30) Foreign Application Priority Data

May 9, 2023 (KR) ........................ 10-2023-0060041
May 3, 2024 (KR) ........................ 10-2024-0058924

(51) Int. Cl.
*B60W 60/00* (2020.01)
*B60W 30/09* (2012.01)

(52) U.S. Cl.
CPC ........ *B60W 60/0016* (2020.02); *B60W 30/09* (2013.01); *B60W 60/0018* (2020.02);
(Continued)

(58) Field of Classification Search
None
See application file for complete search history.

(56) References Cited

U.S. PATENT DOCUMENTS 12,128,909 B1 * 10/2024 Nag .................. B60W 50/0225
2015/0006012 A1 1/2015 Kammel et al.
(Continued)

FOREIGN PATENT DOCUMENTS

EP 2657921 A1 10/2013
EP 3919336 A1 12/2021
WO 2022092682 A1 5/2022

OTHER PUBLICATIONS

Translation of WO 2022/092682 A1 (Year: 2022).*
Aug. 26, 2024—(EP) European Search Report—App. 24174792.2.

*Primary Examiner* — Brian P Sweeney
*Assistant Examiner* — Jonathan E Reinert
(74) *Attorney, Agent, or Firm* — Banner & Witcoff, Ltd.

(57) ABSTRACT

An apparatus for controlling autonomous driving of a vehicle is introduced. The apparatus may comprise at least one sensor to capture surrounding environment data, a processor, and a controller configured to control operations of the vehicle. During autonomous driving, the processor may generate vehicle state information and determine whether a minimal risk maneuver is to be performed, potentially mitigating collision risks. Upon determining to perform the minimal risk maneuver, the processor may determine a maneuver type and a target location. The processor may control, based on the determined maneuver type and the target location, autonomous driving of the vehicle by causing the controller to operate the vehicle to stop at the target location.

15 Claims, 4 Drawing Sheets

(52) U.S. Cl.
CPC ..... *B60W 2420/40* (2013.01); *B60W 2552/00* (2020.02); *B60W 2554/80* (2020.02); *B60W 2710/18* (2013.01); *B60W 2754/10* (2020.02)

(56) References Cited

U.S. PATENT DOCUMENTS

| | | | | |
|---|---|---|---|---|
| 2018/0004215 | A1* | 1/2018 | Miller | B60W 50/0097 |
| 2018/0105174 | A1* | 4/2018 | Russell | B60W 30/18 |
| 2020/0346648 | A1* | 11/2020 | Vanterpool | B60W 20/12 |
| 2023/0138981 | A1* | 5/2023 | Willoughby | B60W 30/143 701/26 |
| 2023/0399018 | A1 | 12/2023 | Yang et al. | |
| 2025/0074468 | A1* | 3/2025 | Park | B60W 60/0011 |

* cited by examiner

FIG. 3

| Categroy | Traffic Lane Stop (301) | | Road Shoulder Stop (303) | |
|---|---|---|---|---|
| Classification | TYPE 1 | TYPE 2 | TYPE 3 | TYPE 4 |
| | Straight stop (311) | In-lane Stop (312) | Half-shoulder Stop (313) | Full-shoulder Stop (314) |
| Description | 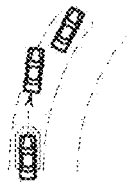 | 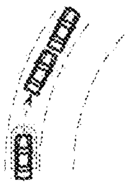 | 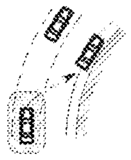 | 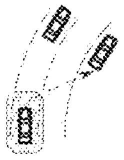 |
| Lateral Control (321) | Not available | Use | Use | Use |
| Acceleration Control (322) | Prohibition | Prohibition | May use to keep current speed | May use to keep current speed |
| Deacceleration Control (323) | Use | Use | Use | Use |
| Lane Change (324) | Prohibition | Prohibition | Use | Use |
| Detection of potential stopping locations out of traffic lanes (325) | Unnecessary | Unnecessary | Use | Use |

FIG. 4

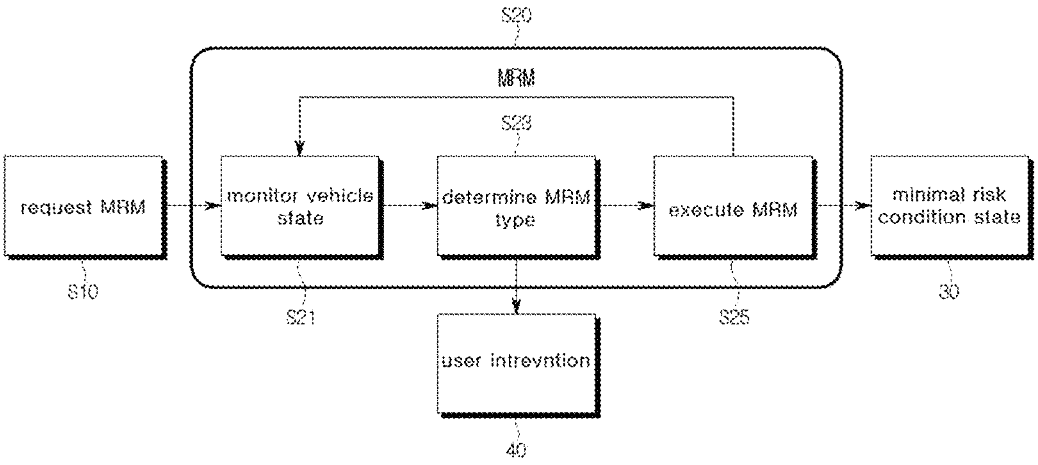

APPARATUS AND METHOD FOR AUTONOMOUS VEHICLE PERFORMING MINIMAL RISK MANEUVER PROXIMATE TO UNSAFE AREAS

CROSS-REFERENCE TO RELATED APPLICATIONS

The present application claims priority to Korean Patent Application No. 10-2023-0060041, filed May 9, 2023 and Korean Patent Application No. 10-2024-0058924, filed May 3, 2024, the entire contents of which are incorporated herein for all purposes.

TECHNICAL FIELD

Various examples relate to a vehicle and a method of operating the vehicle for performing a minimal risk maneuver, in which a method of determining a target location for the vehicle to stop is considered.

BACKGROUND

Advanced driver assistance systems (ADAS) are being developed to assist drivers in their driving. ADAS encompasses a plurality of subcategories of technology and may provide significant convenience to drivers. ADAS is sometimes referred to as autonomous driving or automated driving system (ADS).

However, if a vehicle encounters an unforeseen accident 5 or a failure during autonomous driving, the vehicle may be put in a dangerous situation if appropriate measures are not taken promptly to minimize or reduce the risk of collision with neighboring vehicles and reach a minimal risk state within a short period of time.

SUMMARY

According to the present disclosure, an apparatus for controlling autonomous driving of a vehicle, the apparatus may comprise at least one sensor based on sensing surrounding environment of the vehicle configured to generate surrounding environment information, a processor, and a controller configured to control operations of the vehicle, wherein the processor is configured to generate based on a vehicle state of the vehicle, vehicle state information, during autonomous driving of the vehicle, determine based on at least one of the surrounding environment information or the vehicle state information, whether a minimal risk maneuver is to be performed, wherein the minimal risk maneuver may comprise controlling autonomous driving of the vehicle for reducing a risk of collision, determine based on a determination that the minimal risk maneuver is to be performed, a minimal risk maneuver type and a target location for the vehicle to stop, and control based on the determined minimal risk maneuver type and the target location, autonomous driving of the vehicle by causing the controller to operate the vehicle to stop at the target location.

The apparatus, wherein the processor is further configured to determine whether there is an area inappropriate for the vehicle to stop, and after determining that there is no inappropriate area for the vehicle to stop, determine based on the minimal risk maneuver type and a preset deceleration rate, the target location for the vehicle to stop.

The apparatus, wherein the processor is further configured to, based on a determination that there is an inappropriate area for the vehicle to stop, determine based on the minimal risk maneuver type and a preset deceleration rate, the target location for the vehicle to stop to avoid the inappropriate area.

The apparatus, wherein the processor is further configured to determine the target location by determining an area for the vehicle to stop that is located before the inappropriate area or past the inappropriate area to be the target location.

The apparatus, wherein the processor is configured to determine an area where the preset deceleration rate changes the least for the vehicle to stop, wherein the area is for the vehicle to stop before the inappropriate area or past the inappropriate area.

The apparatus, wherein the processor is configured to determine whether a condition that prevents stopping in an area past the inappropriate area is satisfied and determine based on the condition being satisfied, an area for the vehicle to stop before the inappropriate area.

The apparatus, wherein the processor is configured to cause the controller to adjust the preset deceleration rate or adjust a starting point of deceleration initiation such that the vehicle stops at the target location.

The apparatus, wherein the processor is configured to use an emergency brake to increase a deceleration rate above the preset deceleration rate such that the vehicle stops at the target location.

The apparatus, wherein the area inappropriate for the vehicle to stop may comprise railroad crossings, intersections, building entrances, or building exits.

The apparatus, wherein the minimal risk maneuver may comprise stopping the vehicle in an event of a failure during autonomous driving.

According to the present disclosure, a method for controlling autonomous driving of a vehicle, the method may comprise obtaining by a processor and during autonomous driving of the vehicle, at least one of surrounding environment information or vehicle state information, determining based on at least one of the surrounding environment information or vehicle state information, whether a minimal risk maneuver is to be performed, wherein the minimal risk maneuver may comprise controlling autonomous driving of the vehicle for reducing a risk of collision, determining based on a determination that the minimal risk maneuver is to be performed, a minimal risk maneuver type and a target location for the vehicle to stop, and controlling based on the determined minimal risk maneuver type and the target location, autonomous driving of the vehicle such that the vehicle stops at the target location.

The method, wherein the determining of the target location for the vehicle to stop may comprise determining whether there is an area inappropriate for the vehicle to stop, and after determining that there is no inappropriate area for the vehicle to stop, determining based on the minimal risk maneuver type and a preset deceleration rate, the target location for the vehicle to stop.

The method, wherein the determining the target location for the vehicle to stop further may comprise after determining that there is an inappropriate area for the vehicle to stop, determining based on the minimal risk maneuver type and a preset deceleration rate, the target location for the vehicle to stop to avoid the inappropriate area.

The method, wherein the determining the target location for the vehicle to stop to avoid the inappropriate area may comprise determining an area for the vehicle to stop that is located before the inappropriate area or past the inappropriate area to be the target location.

The method, wherein the determining the area may comprise determining an area where the preset deceleration rate changes the least for the vehicle to stop, wherein the area is for the vehicle to stop before the inappropriate area or past the inappropriate area.

The method, wherein the determining the area may comprise determining whether a condition that prevents stopping in the area past the inappropriate area is satisfied, and determining based on the condition being satisfied, an area for the vehicle to stop before the inappropriate area.

The method, wherein the controlling the autonomous driving of the vehicle may comprise adjusting the preset deceleration rate or adjusting a starting point of deceleration initiation such that the vehicle stops at the target location.

The method, wherein the controlling the autonomous driving of the vehicle may comprise increasing a deceleration rate above the preset deceleration rate by using an emergency brake such that the vehicle stops at the target location.

The method, wherein the area inappropriate for the vehicle to stop may comprise railroad crossings, intersections, building entrances, or building exits.

The method may further comprise stopping, based on the minimal risk maneuver, the vehicle in an event of a failure during autonomous driving of the vehicle.

BRIEF DESCRIPTION OF THE DRAWINGS

FIG. 3 shows an example of vehicle state-specific minimal risk maneuver (MRMV) strategies according to various examples of this document.

FIG. 4 shows an example of a flowchart showing operations for performing minimal risk maneuvers for a vehicle according to various examples.

DETAILED DESCRIPTION

Figure 1:
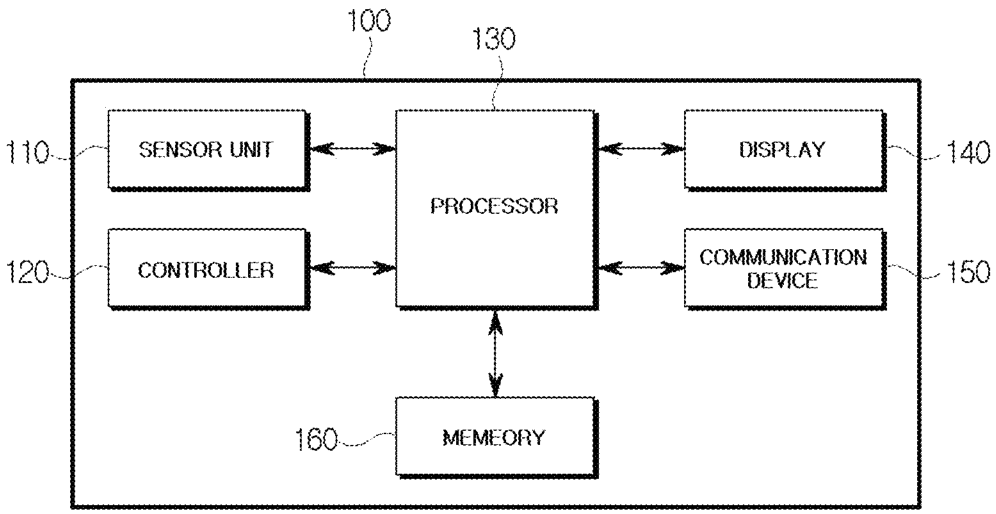
FIG. 1 shows an example of a vehicle according to various examples of this document.

Hereinafter, descriptions are made of the examples of this document in detail with reference to accompanying drawings.

The organization of this disclosure and its operational effects will be readily apparent from the detailed explanations provided below, facilitating a clear understanding. Before the detailed explanation in this document, it is noted that the same reference numeral will be used for the same component whenever possible, even if displayed on different drawings, and that detailed descriptions of some components will be omitted to avoid obscuring the subject matter of this disclosure.

Before proceeding with the detailed explanation in this document, the terms used herein may be defined as follows.

The vehicle is an autonomous driving vehicle equipped with an automated driving system (ADS). For example, the vehicle may perform at least one of steering, acceleration, deceleration, lane change, and stop (or halt) by ADS without driver intervention. ADS may include at least one of a pedestrian detection and collision mitigation system (PDCMS), lane change decision aid system (LCDAS), lane departure warning system (LDWS), adaptive cruise control (ACC), lane keeping assistance system (LKAS), road boundary departure prevention system (RBDPS), curve speed warning system (CSWS), forward vehicle collision warning system (FVCWS), and low speed following (LSF), for example.

An automation level of an autonomous driving vehicle may be classified as follows, according to the American Society of Automotive Engineers (SAE). At autonomous driving level 0, the SAE classification standard may correspond to "no automation," in which an autonomous driving system is temporarily involved in emergency situations (e.g., automatic emergency braking) and/or provides warnings only (e.g., blind spot warning, lane departure warning, etc.), and a driver is expected to operate the vehicle. At autonomous driving level 1, the SAE classification standard may correspond to "driver assistance," in which the system performs some driving functions (e.g., steering, acceleration, brake, lane centering, adaptive cruise control, etc.) while the driver operates the vehicle in a normal operation section, and the driver is expected to determine an operation state and/or timing of the system, perform other driving functions, and cope with (e.g., resolve) emergency situations. At autonomous driving level 2, the SAE classification standard may correspond to "partial automation," in which the system performs steering, acceleration, and/or braking under the supervision of the driver, and the driver is expected to determine an operation state and/or timing of the system, perform other driving functions, and cope with (e.g., resolve) emergency situations. At autonomous driving level 3, the SAE classification standard may correspond to "conditional automation," in which the system drives the vehicle (e.g., performs driving functions such as steering, acceleration, and/or braking) under limited conditions but transfer driving control to the driver if the required conditions are not met, and the driver is expected to determine an operation state and/or timing of the system, and take over control in emergency situations but do not otherwise operate the vehicle (e.g., steer, accelerate, and/or brake). At autonomous driving level 4, the SAE classification standard may correspond to "high automation," in which the system performs all driving functions, and the driver is expected to take control of the vehicle only in emergency situations. At autonomous driving level 5, the SAE classification standard may correspond to "full automation," in which the system performs full driving functions without any aid from the driver including in emergency situations, and the driver is not expected to perform any driving functions other than determining the operating state of the system. Although the present disclosure may apply the SAE classification standard for autonomous driving classification, other classification methods and/or algorithms may be used in one or more configurations described herein.

A driver is a person who uses the vehicle and receives the services of the autonomous driving system.

Vehicle control authority refers to the authority to control at least one component and/or function of the vehicle. At least one function of the vehicle may include, for example, at least one of steering function, acceleration function, deceleration function (or braking function), lane change function, lane detection function, lateral control function, obstacle detection and distance sensing function, powertrain control function, safe area detection function, engine on/off function, power on/off function, and vehicle locking/unlocking function. The listed vehicle functions are examples provided for illustrative purposes, and the examples of this document are not limited thereto.

A shoulder refers to the space between the outermost road boundary (or the boundary of the outermost lane) in the direction of travel of the vehicle and the road edge (e.g., curb, guardrail).

FIG. 1 shows an example of a vehicle according to various examples of this document.

The configuration of the vehicle depicted in FIG. 1 is provided as an example, and each component may be configured as one chip, one component, or one electronic circuit, or a combination of chips, components, and/or electronic circuits. According to an example, some of the components shown in FIG. 1 may be separated into multiple components and configured as different chips, different components, or different electronic circuits, and some components may be combined to be configured as one chip, one component, or one electronic circuit. According to one example, some components shown in FIG. 1 may be omitted, or other components not shown may be added.

Figure 2:
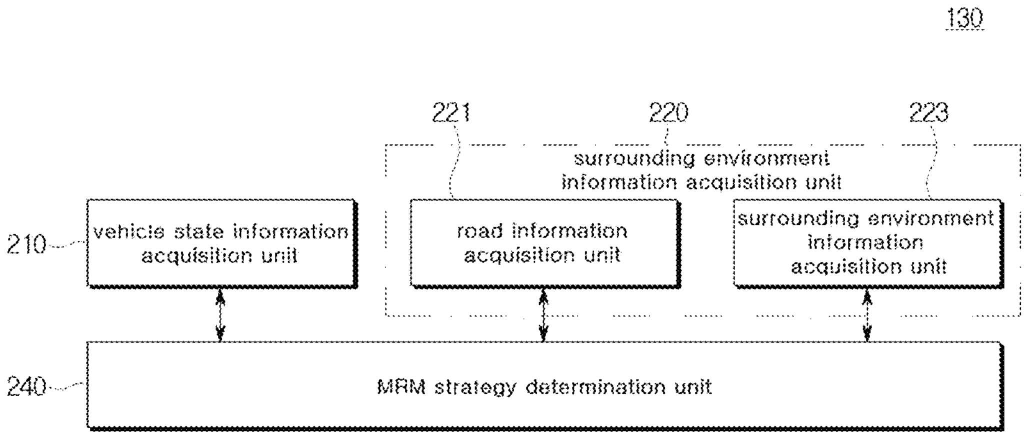
FIG. 2 shows an example of the functions of a processor according to various examples of this document.

FIG. 2 shows an example of the functions of a processor according to various examples of this document, and FIG. 3 shows an example of vehicle state-specific minimal risk maneuver (MRM) strategies according to various examples of this document. A minimal risk maneuver strategies may involve a maneuvering function of a vehicle to minimize or reduce a known risk of collision with surrounding vehicles in order to reach a minimum or reduced/lowered risk state.

With reference to FIG. 1, the vehicle 100 may include a sensor unit 110, a controller 120, a processor 130, a display 140, a communication device 150, and memory 160.

According to various examples, the sensor unit 110 may detect the surrounding environment of the vehicle 100 using at least one sensor and generate data related to the surrounding environment based on the detection results. In an example, the sensor unit 110 may acquire road information, information about objects around the vehicle (e.g., other vehicles, pedestrians, objects, curbs, guardrails, lanes, obstacles), and/or the vehicle's location information based on sensing data obtained from at least one sensor. Road information may include, for example, lane position, lane shape, lane color, lane type, number of lanes, presence of shoulders, or size of shoulders. Objects around the vehicle may include, for example, the position of objects, the size of objects, the shape of objects, the distance to objects, and the relative speed of objects.

According to an example, the sensor unit 110 may include at least one of a camera, light detection and ranging (LiDAR), radio detection and ranging (RADAR), an ultrasonic sensor, an infrared sensor, and a position measurement sensor. The listed sensors are provided as examples for illustrative purposes only, and the sensors included in the sensor unit 110 of this document are not limited thereto. The camera may capture images around the vehicle to generate image data, including lanes and/or surrounding objects in the front, rear, and/or sides of the vehicle 100. The LiDAR may use light (or laser) to generate information about objects located in the front, rear, and/or sides of the vehicle 100. The radar may use electromagnetic waves (or radio waves) to generate information about objects located in the front, rear, and/or sides of the vehicle 100. The ultrasonic sensor may use ultrasonic waves to generate information about objects located in the front, rear, and/or sides of the vehicle 100. The infrared sensor may use infrared to generate information about objects located in the front, rear, and/or sides of the vehicle 100. The position measurement sensor may measure the current position of the vehicle. The position measurement sensor may include at least one of a global positioning system (GPS) sensor, a differential global positioning system (DGPS) sensor, and a global navigation satellite system (GNSS) sensor. The position measurement sensor may generate location data of the vehicle based on signals generated by at least one of the GPS sensor, DGPS sensor, and GNSS sensor.

According to various examples, the controller 120 may control the operation of at least one component of the vehicle 100 and/or at least one function of the vehicle under the control of the processor 130. At least one function may include, for example, steering function, acceleration function or longitudinal acceleration function, deceleration function or longitudinal deceleration function, brake function, lane change function, lane detection function, obstacle detection and distance detection function, lateral control function, powertrain control function, safe area detection function, engine on/off, power on/off, and at least one of locking/unlocking functions of the vehicle.

According to an example, the controller 120 may control the operation of at least one component of the vehicle and/or at least one function of the vehicle for autonomous driving and/or minimal risk maneuver (MRM) of the vehicle 100 under the control of the processor 130. For example, the controller 120 may control the operation of at least one of the steering function, acceleration function, deceleration function, lane change function, lane detection function, lateral control function, obstacle detection and distance detection function, powertrain control function, and safe area detection function for minimal risk maneuver.

According to various examples, the processor 130 may control the overall operation of the vehicle 100. In an example, the processor 130 may include an electrical control unit (ECU) capable of integratively controlling components within the vehicle 100. For example, the processor 130 may include a central processing unit (CPU) or micro controller unit (MCU) capable of performing computational tasks.

According to various examples, the processor 130 may control components within the vehicle 100 to activate the automated driving system (ADS) to enable the vehicle 100 to perform autonomous driving when a specified event occurs. The specified event may occur if autonomous driving is requested by the driver, if vehicle control authority is delegated from the driver, or if conditions specified by the driver and/or architect are satisfied.

According to various examples, the processor 130 may determine whether autonomous driving is possible based on at least one of the vehicle state information and surrounding environmental information during autonomous driving. If autonomous driving is determined to be impossible or impractical, the processor 130 may determine and control the execution of an MRM strategy. Here, the MRM strategy may include an MRM type.

According to an example, as shown in FIG. 2, the processor 130 may include a vehicle information acquisition unit 210, a surrounding environment information acquisition unit 220, and an MRM strategy determination unit 240.

The vehicle state information acquisition unit 210 may monitor the mechanical and/or electrical state of the components (e.g., sensors, actuators, etc.) within the vehicle from the moment the ADS is activated to acquire the vehicle state information indicating whether mechanical faults and/or electrical faults occur in the components within the vehicle. The vehicle state information may include information about the mechanical state and/or electrical state of the components within the vehicle. For example, the vehicle state information may include information indicating whether functions necessary or desirable for autonomous driving are operable based on the mechanical state and/or electrical state of the components within the vehicle.

The surrounding environment information acquisition unit 220 may use the sensor unit 110 and/or communication device 150 from the moment the ADS is activated to acquire the surrounding environment information of the vehicle. The surrounding environment information acquisition unit 220 may include a road information acquisition unit 221 acquiring information about the road on which the vehicle is traveling and a surrounding object information acquisition unit 223 detecting objects around the vehicle from the sensor unit 110.

According to an example, the road information acquisition unit 221 may acquire road information at a location where the vehicle is traveling through the sensor unit 110. According to an example, the road information acquisition unit 221 may acquire map information from an external device (e.g., another vehicle or a server) through the communication device 150 and acquire road information at a location where the vehicle is traveling from the map information.

According to an example, the surrounding object information acquisition unit 223 may acquire information about objects (e.g., another vehicle, people, objects, curbs, guardrails, lanes, and obstacles) around the vehicle through the sensor unit 110. For example, the surrounding object information acquisition unit 223 may acquire information about the distance to and relative speed of at least one vehicle located in the front, on the sides, and/or in the rear of the vehicle.

According to an example, the processor 130 may determine whether the functions necessary or desirable for autonomous driving are operable based on the vehicle state information. The functions necessary or desirable for autonomous driving may include at least one of lane detection function, lane change function, lateral control function, deceleration (or brake control) function, acceleration control function, powertrain control function, safe area detection function, and obstacle recognition and distance measurement function. If at least one of the functions necessary or desirable for autonomous driving is inoperable, the processor 130 may determine autonomous driving to be impossible or impractical.

According to an example, the processor 130 may determine whether the vehicle is in a suitable state for normal operation based on vehicle state information. For example, the processor 130 may determine whether the mechanical state (tire pressure, engine overheating) information warrants normal operation of the vehicle. The processor 130 may determine autonomous driving to be impossible or impractical if the vehicle is in an unsuitable state for normal operation. For example, the processor 130 may determine autonomous driving to be impossible or impractical if the vehicle is inoperable due to tire pressure or engine overheating.

According to an example, the processor 130 may determine whether the environment around the vehicle is suitable for the operation design domain (ODD) of autonomous driving based on one of the surrounding environment information. The operation design domain may represent surrounding environment conditions under which autonomous driving operates normally. If the surrounding environment information of the vehicle does not conform to the operation design domain, the processor 130 may determine autonomous driving to be impossible or impractical.

According to various examples, if autonomous driving is impossible or impractical, the processor 130 may determine that it is necessary or desirable to perform minimal risk maneuvers to minimize or reduce the risk of accidents. If minimal risk maneuver is necessary or desirable, the processor 130 may utilize the MRM strategy determination unit 240 to select one minimal risk maneuver strategy from a plurality of minimal risk maneuver strategies. As shown in FIG. 3, the minimal risk maneuver strategies may include four types. For example, the minimal risk maneuver strategies may include a traffic lane stop 301 strategy that includes type 1 and type 2 and a road shoulders stop 303 strategy that includes type 3 and type 4.

The traffic lane stop 301 strategy may include type 1 straight stop 311 and type 2 in-lane stop 312. The road shoulders stop 303 strategy may include type 3 half-shoulder stop 313 and type 4 full-shoulder stop 314.

Type 1 straight stop 311 involves using only the deceleration control 323, which is a longitudinal deceleration function, without involving lateral control. For example, straight stop 311 may be performed in situations where lane detection is impossible or impractical or lateral control is impossible or impractical due to actuator failure. In type 1 straight stop 311, acceleration control 322 and lane change 324 are prohibited, and the function of detection of potential stopping locations out of traffic lane 325 may be unnecessary or undesirable. Here, the detection of potential stopping locations out of traffic lane may refer to the function of detecting the positions of safe areas located outside traffic lanes, such as shoulders or rest areas.

Type 2 in-lane stop 312 refers to stopping within the boundaries of the lane the vehicle was traveling in. For example, in-lane stop 312 may mean stopping within the boundaries of the lane where the vehicle was traveling using lateral control 321 and/or deceleration control 323. The lane the vehicle was traveling in may refer to the lane being traveled at the time the need for minimal risk maneuvering is determined. During an in-lane stop 312, acceleration control 322 and lane change 324 are prohibited, and the function of detection of potential stopping locations out of traffic lane 325 may be unnecessary or undesirable.

Type 3 half-shoulder stop 313 refers to stopping with a portion of the vehicle positioned on the shoulder of the road, and type 4 full-shoulder stop 314 refers to stopping when the entire vehicle positioned on the shoulder of the road. During half-shoulder stop 313 and full-shoulder stop 314, the functions of lateral control 321, deceleration control 323, lane change 324, and detection of potential stopping locations outside the lane 325 may be utilized, while acceleration control 322 may be used only to maintain the current speed.

According to an example, the MRM types described above may be prioritized based on the road, the surrounding environment, and the fail-operational capability of the vehicle. For example, MRM types corresponding to the road shoulders stop 303 strategy may be prioritized over the MRM types corresponding to the traffic lane stop 301 strategy to minimize or reduce the risk of stopping. Further, the full-shoulder stop 314 strategy may be prioritized over the half-shoulder stop 313 strategy, and in-lane stop 313 may be prioritized over the straight-lane stop 311. In other words, the priority of MRM types may be set in decreasing order of full-shoulder stop 314, half-shoulder stop 313, in-lane stop 312, and straight stop 311.

According to various examples, the MRM strategy determination unit 240 of the processor 130 may select an MRM strategy based on at least one of the vehicle state information and surrounding environment information.

According to an example, the MRM strategy determination unit 240 may identify or determine an operable MRM type among the MRM types described above based on operable functions and/or inoperable functions among the functions necessary or desirable for autonomous driving based on the vehicle state information. For example, if the lateral control 321 function is operating normally, it may be determined that the straight stop 311, in-lane stop 312, half-shoulder stop 313, and full-shoulder stop 314 may all be performed. Another example may be an operable MRM type being determined to include only straight stop 311 if the lateral control 321 is inoperable.

If there is one operable MRM type identified based on the vehicle state information, the MRM strategy determination unit 240 may determine the MRM type to be the MRM strategy. For example, since only straight stop 311 may be performed in situations where the lateral control 321 function is inoperable, the MRM strategy determination unit 240 may determine the straight stop 311 to be the MRM strategy. Another example is the MRM strategy determination unit 240 determining the straight stop 311 to be the MRM strategy because only straight stop 311 may be performed if no driving lane is detected due to a sensor failure and/or external environmental factors.

If there is a plurality of operable MRM types identified based on the vehicle state information, the MRM strategy determination unit 240 may determine an MRM type operable within a specified minimal risk condition (MRC) range. According to an example, the specified MRM range may be set and/or modified by operators and/or architects. According to an example, the MRC range may be set differently depending on vehicle performance, vehicle type, and/or external environmental factors (e.g., weather, time of day, etc.).

According to an example, the MRM strategy determination unit 240 may determine an MRM type operable within the MRC range based on whether there is a shoulder within the specified MRC range. If no shoulder exits within the specified MRC range, the MRM strategy determination unit 240 may determine an MRM type operable within the MRC range to be the in-lane stop 312 or straight stop 311.

If there is a shoulder within the specified MRC range, the MRM strategy determination unit 240 may determine an MRM type operable within the MRC range based on the size of the shoulder. If the size of the shoulder within the specified MRC range is equal to or greater than a specified size, the MRM strategy determination unit 240 may determine the full-shoulder stop 314, the half-shoulder stop 313, in-lane stop 312, and the straight stop 311 to be an operable MRM type. The specified size may be determined based on the size of the vehicle. If the size of the shoulder is less than the specified size, the MRM strategy determination unit 240 may determine the half-shoulder stop 313, the in-lane stop 312, and the straight stop 311 to be an operable MRM type.

According to various examples, if there is a plurality of MRM types operable within a specified MRC range, the MRM strategy determination unit 240 may select a final MRM strategy in consideration of the priority and/or neighboring object information.

According to an example, if there is a plurality of MRM types operable within a specified MRC range, the MRM strategy determination unit 240 may select the MRM type with the highest priority among the MRM types operable within the specified MRC range as the final MRM strategy.

FIG. 4 shows an example of a flowchart showing operations for performing minimal risk maneuvers for a vehicle according to various examples.

FIG. 4 shows that the vehicle 100 may acquire a request to initiate the minimal risk maneuver (MRM) in S10. According to examples, if the vehicle 100 is started and the vehicle 100 begins to travel at a certain speed or higher, the processor 130 may generate a request to initiate the minimal risk maneuver function. Alternatively or additionally, the processor 130 may acquire vehicle 100 state information and the surrounding environment information of the vehicle 100 and generate a minimal risk maneuver request based on the acquired state and environment information. Alternatively or additionally, the processor 130 may obtain a minimal risk maneuver request from the outside via the communication device 150 or sensor 110. The minimal risk maneuver request may refer to any command enabling the vehicle 100 to perform minimal risk maneuver.

If there is a minimal risk maneuver request, the vehicle 100 may perform a minimal risk maneuver function.

The minimal risk maneuver function may include monitoring a vehicle state (S21), determining an MRM type (S23), and executing the determined MRM type (S25).

Once a minimal risk maneuver request is obtained (S10), the vehicle 100 may monitor the state of the vehicle 100 in S21. The vehicle 100 may check the state of the autonomous driving system and/or vehicle, analyze the severity of the failure, if any, and recognize the impact on the autonomous driving system and/or vehicle in S21. Further, the vehicle 100 may check the state of relevant system components to determine the current dynamic driving task (DDT) performance capability of the autonomous driving system.

According to examples, the vehicle 100 may use the vehicle state information acquisition unit 210 and the surrounding environment information acquisition unit 220 to monitor the state of the components of the vehicle 100 and the surrounding environment information of the vehicle 100. The vehicle 100 may acquire state information of each component of the vehicle 100 and surrounding environment information of the surroundings in which the vehicle 100 is traveling, e.g., lanes, neighboring vehicle information, etc., in real time. The vehicle 100 may determine which sensor 110 or which component is currently operable.

The vehicle 100 may determine an MRM type for emergency braking based on the obtained vehicle stated information and surrounding environment information in S23. According to various examples, the MRM type of the vehicle may include straight stop, in-lane stop, half-shoulder stop, and full-shoulder shop, but is not limited thereto. Other examples may include more MRM types.

Based on the determination results of a failure state, the vehicle 100 may determine an MRM type appropriate for the current failure type. According to an example, if only deceleration control of the vehicle is possible, only the straight stop may be selected as an operable type. According to another example, if steering control and deceleration control of the vehicle are possible, the in-lane stopping type may be selected in addition or alternative to the straight stop. According to still another example, when the lane change function and shoulder detection function as well as the steering control and deceleration control of the vehicle among the autonomous driving functions may be performed, the half-shoulder stop type and full-shoulder stop type may also be selected.

The vehicle 100 may execute the determined MRM type in S25 according to the determination in S23 to terminate the minimal risk maneuver function if the minimal risk state 30, e.g., a stop state, is reached.

According to an example, the vehicle 100 usually maintains the initial MRM type determined in S23 and executes the MRM accordingly in S25. If it is determined that the selected MRM type is inoperable due to a significant change in internal or external factors or a change in the traffic conditions, the vehicle 100 may change the MRM type. At this time, if it becomes necessary or desirable to change the MRM type while executing the MRM type already determined in S25, the vehicle 100 may need or want to change the MRM type in a manner that does not delay meeting the minimal risk requirement rationally and safely.

According to an example, if there is an intervention 40 for a person, including a driver, to take over the DDT at any point the vehicle 100 is performing the minimal risk maneuver function, all autonomous driving functions including the minimal risk maneuver function are terminated and the person may gain control authority over the vehicle.

As described above, the operation of determining the MRM type in S23 in FIG. 4 may be performed by the MRM strategy determination unit 240 of the vehicle 100.

The MRM strategy determination unit 240 may determine a location that meets the minimal risk requirement, i.e., a target location for the vehicle 100 to stop, in addition or alternative to the determination of the MRM type, based on the vehicle state information and surrounding environment information.

According to an example, the MRM strategy determination unit 240 may generate a vehicle control command based on the determined MRM type and/or target location to transmit the command to the controller 120, and the controller 120 may control the vehicle 100 based on the command to execute the determined MRM type such that the vehicle 100 reaches a state that meets the minimal risk requirement at the target location. According to another example, the controller 120 may obtain the MRM type and target location from the MRM strategy determination unit 240 and directly control the vehicle such that the MRM type is executed and the vehicle 100 reaches a state that meets the minimal risk requirement at the target location.

In determining the target location, the MRM strategy determination unit 240 may not select a place inappropriate for the vehicle to stop for safety and convenience reasons. For example, the MRM strategy determination unit 240 may determine the target location such that the vehicle does not reach the minimal risk requirement state at a place inappropriate for the vehicle to stop such as railroad crossings, intersections, and building entrances and exits.

According to an example, the surrounding environment information acquisition unit 220 may acquire road information and/or surrounding object information, and the MRM strategy determination unit 240 may select a place inappropriate for the vehicle to stop based on the road information and/or surrounding object information and control the vehicle such that the vehicle does not stop at the place.

Figure 5:
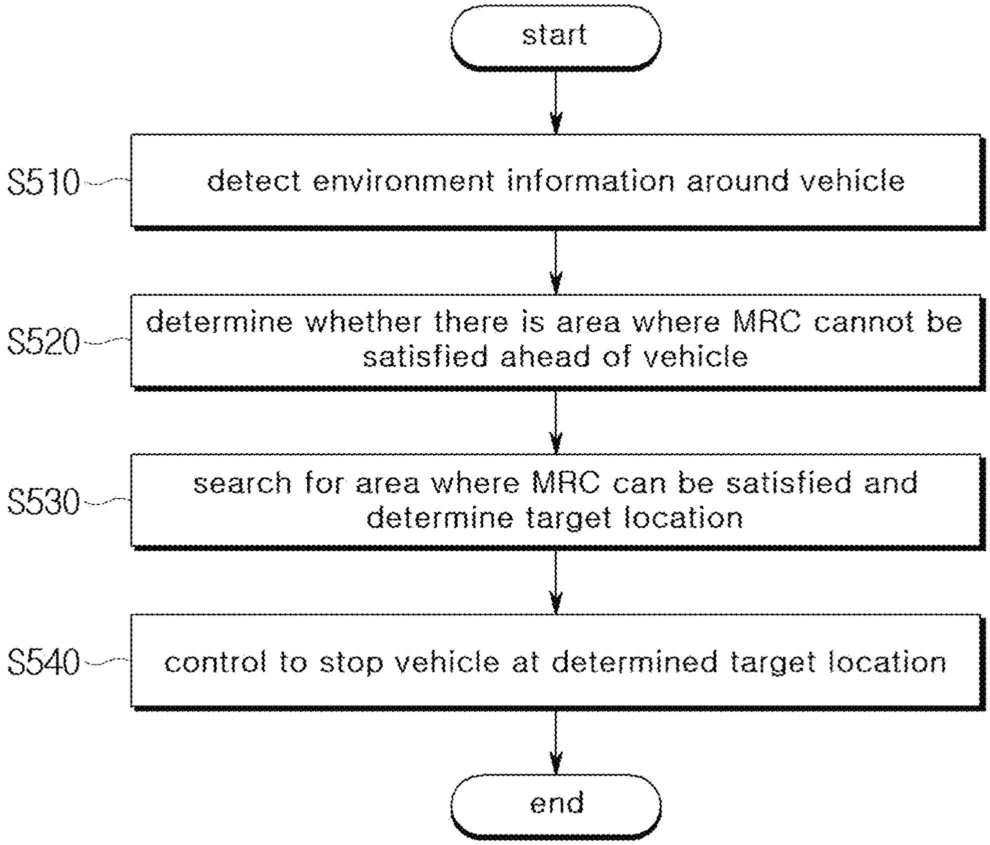
FIG. 5 shows an example of a flowchart showing operations of determining a target location and controlling a vehicle such that a minimal risk requirement state materializes at the target location if performing minimal risk maneuvers for a vehicle according to various examples.

FIG. 5 shows an example of a flowchart showing operations of determining a target location and controlling a vehicle such that the minimal risk requirement state does not materialize at the target location when performing minimal risk maneuvers for a vehicle according to various examples.

If there is an MRM request as shown in FIG. 4, the vehicle 100 may acquire surrounding environment information of the vehicle (S510). According to an example, the vehicle 100 may use the surrounding environment information acquisition unit 220 to acquire road information, surrounding object information, etc.

According to an example, the road information may include map information obtained from an external device through the communication device 150, and the map information may include information about stopping areas inappropriate for safety and convenience reasons such as railroad crossings, intersections, building entrances and exits, etc. around the vehicle.

Further, the vehicle 100 may also use cameras and the like to acquire object information that may provide information about inappropriate stopping areas for legal, safety, and convenience reasons, such as buildings and fire hydrants.

The vehicle 100 may determine, based on the detected surrounding environment information, the presence of location ahead of the vehicle inappropriate for stopping per the minimal risk requirement in S520.

According to an example, the vehicle 100 may determine whether there is a location inappropriate for stopping for safety and convenience reasons, such as railroad crossings, intersections, front of building entrances and exits, close neighborhood of a fire hydrant, etc., ahead of the vehicle.

The vehicle 100 may search for a location where stopping, which is the minimal risk requirement, is possible to set the target location in S530.

According to an example, if there is a location or area inappropriate for stopping ahead of the vehicle, the vehicle 100 may select a preset MRM type and determine the target location appropriate for stopping under the assumption that the vehicle travels at a preset deceleration rate (e.g., $-4$ $m/s^2$).

Figure 6:
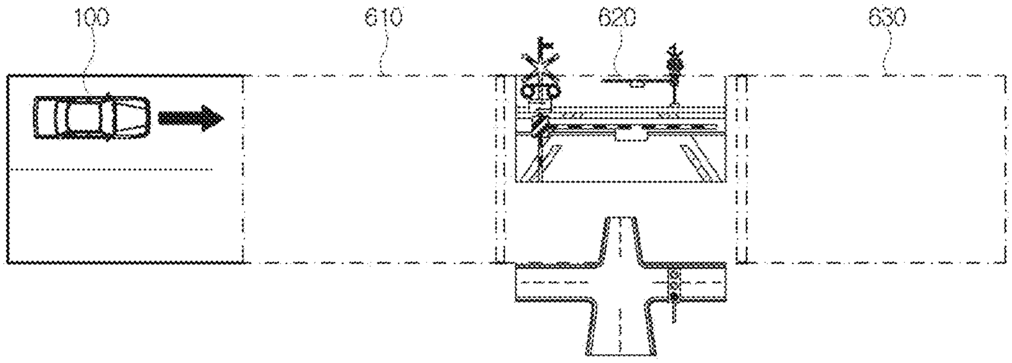
FIG. 6 shows an example of determining a target location when there is an area inappropriate for stopping ahead of the vehicle.

FIG. 6 shows an example of determining the target location if there is a location or area inappropriate for stopping ahead of the vehicle.

As shown in the example shown in FIG. 6, if there is a location or area 620 inappropriate for stopping ahead of the vehicle, the vehicle 100 may determine whether to stop in the stoppable area 610 before the non-stoppable area 620 or in a stoppable area 630 past the non-stoppable area 620.

The vehicle 100 may determine the point where the vehicle may come to a stop while changing the preset deceleration rate (e.g., $-4$ $m/s^2$) the least to be the target location. However, if a railroad crossing gate arm is lowered or if a traffic jam makes it impossible or impractical to enter an intersection, the stoppable area 610 before the non-stoppable area 620 may be determined to be the target location.

The vehicle 100 may perform the vehicle control to stop the vehicle at the determined location in S540.

According to an example, the vehicle 100 may adjust the deceleration rate of the vehicle or adjust the starting point of deceleration initiation to stop the vehicle at the target location. For example, assuming that operating the vehicle at a deceleration rate (e.g., $-4$ $m/s^2$) preset in the vehicle may bring the vehicle to a stop upon reaching a reference distance (e.g., 200 m), the deceleration rate may be increased to a value greater than the preset deceleration rate ($-4$ $m/s^2$) if the distance to the target location (e.g., 100 m) is shorter than the reference distance. Conversely, if the distance to the target location (e.g., 400 m) is longer than the reference distance, the deceleration rate may be decreased to a value smaller than the preset deceleration rate ($-4$ $m/s^2$) or the starting point of deceleration initiation may be delayed until the distance to the target location equals the reference distance.

If an abrupt deceleration is necessary or desirable, such as when the vehicle's deceleration rate (e.g., $-5$ $m/s^2$) is increased over the preset deceleration rate (e.g., $-4$ $m/s^2$), a separate function that may increase the deceleration rate in addition or alternative to the MRM function, such as the emergency brake, may be activated.

As described above, various examples may prevent the vehicle from stopping at an inappropriate location to improve safety while minimizing risks to the vehicle if the minimal risk maneuver (MRM) function is performed to meet the minimal risk requirement, i.e., to reach the stop state, in the event of a failure during autonomous driving.

In an autonomous driving vehicle, if a minimal risk maneuver function is initiated, the vehicle is controlled according to a preset minimal risk maneuver method, and autonomous driving is terminated if a minimal risk state requirement is met. The current minimal risk maneuver standard states that the minimal risk state requirement is met if the vehicle speed is 0 and the vehicle is stopped. However, the minimal risk state requirement may be inappropriate for certain locations such as railroad crossings. This issue is yet to be addressed.

Various examples of the present disclosure may provide a vehicle control method that allows the minimal risk maneuver function to be performed to reach the minimal risk state, that is, a stop state, and allows the vehicle to come to a stop while avoiding inappropriate locations in the event of a failure during autonomous driving.

The technical objects of this document are not limited to the aforesaid, and other objects not described herein will be clearly understood by those skilled in the art from the descriptions below.

According to various examples of this document, an autonomous driving vehicle may include at least one sensor sensing the surrounding environment of the vehicle to generate surrounding environment information, a processor monitoring vehicle states to generate vehicle state information and controlling the autonomous driving of the vehicle, and a controller controlling operations of the vehicle under the control of the processor.

According to the various examples of this document, the processor may be configured to determine whether the minimal risk maneuver is necessary or desirable based on at least one of the surrounding environment information and the vehicle state information, determine a minimal risk maneuver type and the target location for the vehicle to stop if the minimal risk maneuver is necessary or desirable, and control the vehicle based on the determined minimal risk maneuver type such that the vehicle stops at the target location, during autonomous driving of the vehicle.

The processor may be further configured to determine whether there is an area inappropriate for the vehicle to stop. If it is determined that there is no inappropriate area, the processor may be configured to determine the target location for the vehicle to stop based on the minimal risk maneuver type and preset deceleration rate.

If it is determined that there is an inappropriate area, the processor may be further configured to determine the target location for the vehicle to stop to avoid the inappropriate area.

In determining the target location for the vehicle to stop to avoid the inappropriate area, the processor may be further configured to determine either an area before the inappropriate area or an area past the inappropriate area to be the target location for the vehicle to stop.

The processor may be further configured to determine an area where the vehicle may come to a stop while changing the preset deceleration rate the least among the area before the inappropriate area and the area past the inappropriate area to be the target area for the vehicle to stop.

The processor may be further configured to determine whether a condition that prevents stopping in the area past the inappropriate area is satisfied. If the condition is satisfied, the processor may determine the area before the inappropriate area to be the target location for the vehicle to stop.

Further, the processor may be configured to cause the controller to adjust the deceleration rate or adjust the starting point of deceleration initiation such that the vehicle stops at the target location.

Further, if it is necessary or desirable to increase the deceleration rate over the preset deceleration rate to stop the vehicle at the target location, the processor may be configured to use an emergency brake to increase the deceleration rate.

Further, the area inappropriate for the vehicle to stop may include railroad crossings, intersections, and building entrances and exits.

According to various examples of this document, a method of operating a vehicle may include obtaining at least one of surrounding environment information and vehicle state information, determining whether a minimal risk maneuver is necessary or desirable based on at least one of the surrounding environment information and vehicle state information, determining a minimal risk maneuver type and the target location for the vehicle to stop if it is determined that the minimal risk maneuver is necessary or desirable, and controlling the vehicle such that the vehicle stops at the target location based on the determined minimal risk maneuver type and target location, during autonomous driving of the vehicle.

Further, the determining of the target location for the vehicle to stop may include determining whether there is an area inappropriate for the vehicle to stop and determining the target location for the vehicle to stop based on the minimal risk maneuver type and preset deceleration rate if it is determined that there is no inappropriate area.

Further, if it is determined that there is an inappropriate area, the determining of the target location for the vehicle to stop may include determining the target location for the vehicle to stop to avoid the inappropriate area.

Further, the determining of the target location for the vehicle to stop to avoid the inappropriate area may include determining either an area before the inappropriate area or an area past the inappropriate area to be the target location for the vehicle to stop.

Further, the determining of either an area before the inappropriate area or an area past the inappropriate area to be the target location for the vehicle to stop may include determining an area where the vehicle may come to a stop while changing the preset deceleration rate the least among the area before the inappropriate area and the area past the inappropriate area to be the target location for the vehicle to stop.

Further, the determining of either an area before the inappropriate area or an area past the inappropriate area to be the target location for the vehicle to stop may include determining whether a condition that prevents stopping in the area past the inappropriate area is satisfied and determining the area before the inappropriate area to be the target location for the vehicle to stop if the condition is satisfied.

Further, the controlling of the vehicle such that the vehicle stops at the target location may include adjusting the deceleration rate or adjusting the starting point of deceleration initiation such that the vehicle stops at the target location.

Further, the controlling of the vehicle such that the vehicle stops at the target location may include increasing the deceleration rate by using an emergency brake if it is necessary or desirable to increase the deceleration rate over the preset deceleration rate such that the vehicle stops at the target location.

According to various examples of this document, if the vehicle detects a situation where normal autonomous driving is impossible or impractical during autonomous driving, the risk to the vehicle may be minimize or reduced and safety improves by preventing the vehicle from stopping in an area inappropriate for safety and convenience reasons without introducing additional risk to the vehicle considered to have reached the minimal risk requirement state.

What is claimed is:

1. An apparatus for controlling autonomous driving of a vehicle, the apparatus comprising:
- at least one sensor, based on sensing surrounding environment of the vehicle, configured to generate surrounding environment information;
- a processor; and
- a controller configured to control operations of the vehicle, wherein the processor is configured to:
  - generate, based on a vehicle state of the vehicle, vehicle state information,
  - during autonomous driving of the vehicle, determine, based on at least one of the surrounding environment information or the vehicle state information, whether a minimal risk maneuver is to be performed, wherein the minimal risk maneuver comprises controlling autonomous driving of the vehicle for reducing a risk of collision,
  - determine, based on a determination that the minimal risk maneuver is to be performed, a minimal risk maneuver type and a target location for the vehicle to stop, and
  - control, based on the determined minimal risk maneuver type and the target location, autonomous driving of the vehicle by causing the controller to operate the vehicle to stop at the target location,
- wherein the processor is configured to:
- determine whether there is an area inappropriate for the vehicle to stop; and
- after determining that there is an area inappropriate for the vehicle to stop, determine, based on a minimum change of a preset deceleration rate, the target location for the vehicle to stop as one of an area before the area inappropriate for the vehicle to stop and an area past the area inappropriate for the vehicle to stop.

2. The apparatus of claim 1, wherein the processor is further configured to:
- after determining that there is no area inappropriate for the vehicle to stop, determine, based on the minimal risk maneuver type and the preset deceleration rate, the target location for the vehicle to stop.

3. The apparatus of claim 1, wherein the processor is configured to:
- determine whether a condition that prevents stopping in an area past the area inappropriate for the vehicle to stop is satisfied and
- determine, based on the condition being satisfied, an area for the vehicle to stop before the area inappropriate for the vehicle to stop.

4. The apparatus of claim 1, wherein the processor is configured to cause the controller to adjust the preset deceleration rate or adjust a starting point of deceleration initiation such that the vehicle stops at the target location.

5. The apparatus of claim 1, wherein the processor is configured to use an emergency brake to increase a deceleration rate above the preset deceleration rate such that the vehicle stops at the target location.

6. The apparatus of claim 1, wherein the area inappropriate for the vehicle to stop comprises railroad crossings, intersections, building entrances, or building exits,
- wherein the target location for the vehicle to stop is determined, among a plurality of candidate target locations for the vehicle to stop, based on the minimum change of the preset deceleration rate, and
- wherein an initiation of a deceleration of the determined minimal risk maneuver type is delayed based on a condition for the determined minimal risk maneuver type associated with the target location being satisfied.

7. The apparatus of claim 1, wherein the minimal risk maneuver comprises stopping the vehicle in an event of a failure during autonomous driving.

8. A method for controlling autonomous driving of a vehicle, the method comprising:
- obtaining, by a processor and during autonomous driving of the vehicle, at least one of surrounding environment information or vehicle state information;
- determining, based on at least one of the surrounding environment information or the vehicle state information, whether a minimal risk maneuver is to be performed, wherein the minimal risk maneuver comprises controlling autonomous driving of the vehicle for reducing a risk of collision;
- determining, based on a determination that the minimal risk maneuver is to be performed, a minimal risk maneuver type and a target location for the vehicle to stop; and
- controlling, based on the determined minimal risk maneuver type and the target location, autonomous driving of the vehicle such that the vehicle stops at the target location,
- wherein the determining of the target location for the vehicle to stop comprises:
  - determining whether there is an area inappropriate for the vehicle to stop; and
  - after determining that there is an area inappropriate for the vehicle to stop, determining, based on a minimum change of a preset deceleration rate, the target location for the vehicle to stop as one of an area before the area inappropriate for the vehicle to stop and an area past the area inappropriate for the vehicle to stop.

9. The method of claim 8, further comprising:
- after determining that there is no area inappropriate for the vehicle to stop, determining, based on the minimal risk maneuver type and the preset deceleration rate, a target location for the vehicle to stop.

10. The method of claim 8, wherein the determining the area comprises:
- determining whether a condition that prevents stopping in the area past the area inappropriate for the vehicle to stop is satisfied; and
- determining, based on the condition being satisfied, an area for the vehicle to stop before the area inappropriate for the vehicle to stop.

11. The method of claim 8, wherein the controlling the autonomous driving of the vehicle comprises adjusting the preset deceleration rate or adjusting a starting point of deceleration initiation such that the vehicle stops at the target location.

12. The method of claim 8, wherein the controlling the autonomous driving of the vehicle comprises increasing a deceleration rate above the preset deceleration rate by using an emergency brake such that the vehicle stops at the target location.

13. The method of claim 8, wherein the area inappropriate for the vehicle to stop comprises railroad crossings, intersections, building entrances, or building exits, wherein the target location for the vehicle to stop is determined, among a plurality of candidate target locations for the vehicle to stop, based on the minimum change of the preset deceleration rate, and wherein an initiation of a deceleration of the determined minimal risk maneuver type is delayed based on a condition for the determined minimal risk maneuver type associated with the target location being satisfied.

14. The method of claim 8, further comprising:

stopping, based on the minimal risk maneuver, the vehicle in an event of a failure during autonomous driving of the vehicle.

15. A vehicle comprising:

at least one sensor, based on sensing surrounding environment of the vehicle, configured to generate surrounding environment information;

a processor; and a driving controller circuit configured to control driving operations of the vehicle, wherein the processor is configured to:

generate, based on a vehicle state of the vehicle, vehicle state information, during autonomous driving of the vehicle, determine, based on at least one of the surrounding environment information or the vehicle state information, whether a minimal risk maneuver is to be performed, wherein the minimal risk maneuver comprises controlling autonomous driving of the vehicle for reducing a risk of collision, determine, based on a determination that the minimal risk maneuver is to be performed, a minimal risk maneuver type and a target location for the vehicle to stop, and control, based on the determined minimal risk maneuver type and the target location, autonomous driving of the vehicle by causing the controller to operate the vehicle to stop at the target location, wherein the processor is further configured to:

determine whether there is an area inappropriate for the vehicle to stop, after determining that there is no area inappropriate for the vehicle to stop, determine, based on the minimal risk maneuver type and a preset deceleration rate, the target location for the vehicle to stop, and after determining that there is an area inappropriate for the vehicle to stop, determine, based on a minimum change of the preset deceleration rate, the target location for the vehicle to stop as one of an area before the area inappropriate for the vehicle to stop and an area past the area inappropriate for the vehicle to stop.

* * * * *